Sept. 20, 1955        J. F. DEXTER        2,718,052

METHOD FOR THE MANUFACTURE OF ELECTRIC COIL SIDES

Filed Oct. 12, 1951

INVENTOR.
JOHN F. DEXTER
BY Robert F. Fleming Jr.

ATTORNEY

United States Patent Office 2,718,052
Patented Sept. 20, 1955

2,718,052

METHOD FOR THE MANUFACTURE OF ELECTRIC COIL SIDES

John F. Dexter, Midland, Mich., assignor to Dow Corning Corporation, Midland, Mich., a corporation of Michigan Application October 12, 1951, Serial No. 251,031

1 Claim. (Cl. 29—548)

The present invention relates to insulated conductors. It is particularly concerned with curved conductors such as those used as coil sides in electrical machines such as motors and generators.

In the past, insulated conductors such as armature and stator coils for use in electrical machines such as motors and generators have been prepared by bending the individual conductors to the desired shape, and then individually wrapping each conductor with a tape comprising the desired type of insulation. These insulated conductors were then assembled in the desired number and the assembly was wound with the insulating tape. Insulated conductor assemblies have also been prepared by assembling a number of individually insulated wires and then bending the assembly. The "primary" or "ground" insulation, usually in the form of a tape, was then applied around the curved conductor assembly. Manufacturing the coils in this manner is time consuming and expensive and a great deal of individual attention and manual control is necessary in order to obtain a satisfactory product.

It is an object of the present invention to provide improved methods for the manufacture of curved insulated conductors and to provide improved armature and stator coils at reduced cost. Other objects and advantages will be apparent from the following description.

A preferred form of the present invention is shown in the accompanying drawings in which.

Figure 4:
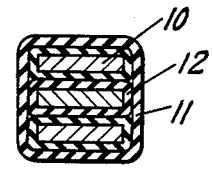
Fig. 4 is a section along the line 4—4 of Fig. 1.
Figure 5:
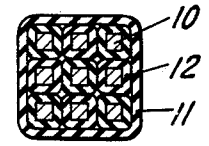
Fig. 5 is a section illustrating a modification of the section shown in Fig. 4.

In a preferred embodiment of this invention the straight metallic conductors 10 are each individually enclosed in any conventional flexible electrical insulation 12. The insulated conductors are then assembled in the desired number and enclosed in a tube of an elastomeric organosiloxane material 11. The conductors may be assembled in any conventional form and in any desired number. The conductors themselves may be in the form of flat bars as is illustrated in Fig. 4 or they may be in the form of rods or wires as is illustrated in Fig. 5. It is to be understood that the invention is not limited to the form or manner of assembling the conductor bars. In some instances it may even be desirable to have a single conductor in the assembly rather than the plurality of conductors which have been shown for illustrative purposes only.

Figure 1:
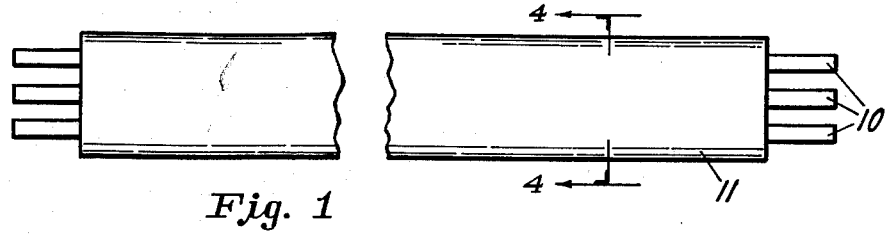
Fig. 1 is a side view of a straight conductor bar assembly.
Figure 2:
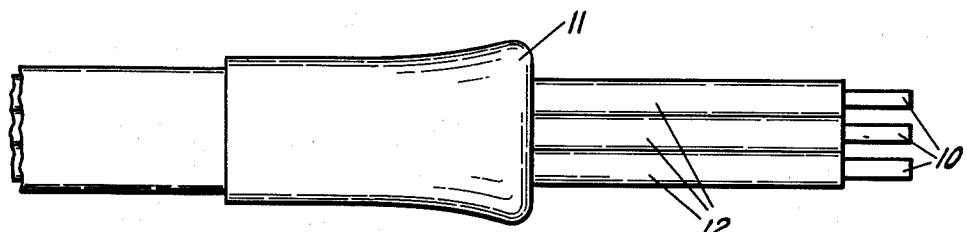
Fig. 2 is a side view of an end portion of a conductor bar assembly, showing the outside insulation rolled back upon itself.
Figure 3:
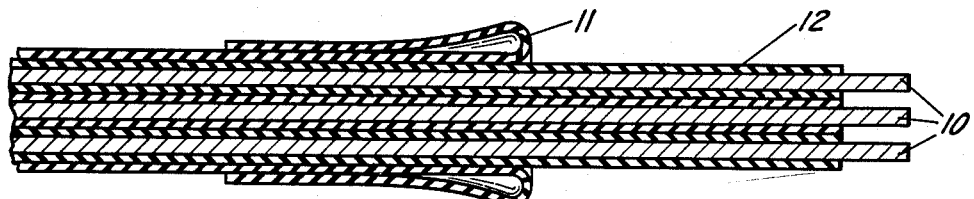
Fig. 3 is a section corresponding to the side view in Fig. 2.

After enclosing the assembled conductors in the tube of elastomeric organosiloxane 11 as is shown in Fig. 1, the end of said tube is rolled back upon itself thus exposing one end of the conductor assembly as is illustrated in Figs. 2 and 3. By "rolled back upon itself" it is not necessarily implied that the tube is rolled over and over. In fact the preferred manner of conducting this step is to turn the end of the tube back upon itself and then to pull back the turned-back end to the desired point in such a manner that only one fold is formed in the tube as shown in Figs. 2, 3 and 6.

Figure 6:
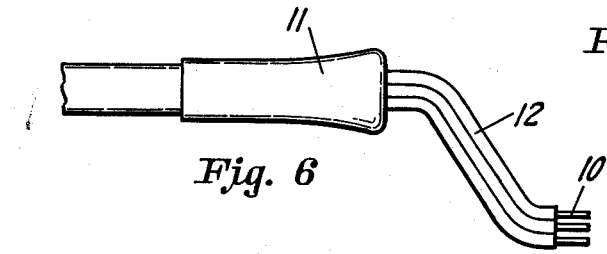
Fig. 6 is a side view of an end portion of a curved conductor bar assembly with the outside insulation rolled back upon itself.

The exposed end of the assembled conductors may then be formed into the desired curved configuration as shown in Fig. 6. The exact manner in which this configuration is obtained does not form a material part of this invention. These curves are often of a highly elaborate or complex nature and are conventionally formed by hammering the assembled conductors around a form suited for that purpose. It is this step of curving the insulated conductor which has caused the failure of all previous attempts at forming such a curve after the outside insulation has been applied.

Figure 7:
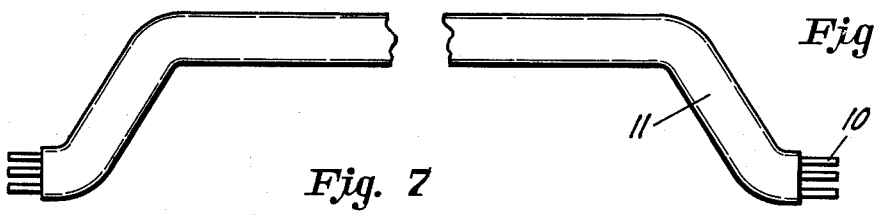
Fig. 7 is a completed curved conductor bar assembly.

After the assembled conductors have been formed into the desired shape, the rolled portion of the elastomeric tube is unrolled, thus covering the curved portion of the conductor. A complete conductor bar in accordance herewith in the form of an armature coil side is illustrated in Fig. 7.

The insulation 12 should be such that when the conductors are curved the integrity of the insulation is not disrupted. This insulation may be elastomeric or resinous in nature or may be comprised of a laminate containing fabrics such as fiber glass. A particularly desirable form for such insulation is that of an elastomeric organosiloxane coated upon a glass fabric, the glass fabric being wound upon the conductor in such a manner that the warp and fill threads bear a biased relationship to the longitudinal axis of the conductor, as is disclosed in greater detail in my copending application Serial No. 185,029, filed September 15, 1950, now Patent No. 2,675,421.

Another preferred form for the individually insulated conductors is that of the well known resin bonded glass served type of conductor. Preferably the resin used in such types of insulation is an organopolysiloxane resin. Such resins are well known, commercially available materials. Conventional organic laminating or bonding resins may also be employed, but this tends to limit the heat stability of the finished product.

After assembling the desired number of insulated conductors, it is often desirable to heat press the assembly in a suitable mold, thus making the assembly an integral unit. If this is done, however, it is preferable that the heat pressing be carried out only on the central portion of the assembly. This leaves the end portions of the assembled insulated conductors, which are to be curved to the desired configuration, free to slip over one another during the bending operation and thus creates no strains between the various insulating layers.

The organosiloxane elastomeric materials which are used to enclose the assembled insulated conductors are well known materials. The preparation of these elastomers has been described in U. S. Patent 2,541,137 and in a number of other patents and publications. Such organosiloxane elastomers are now commercially available. For the purposes of this invention, it is preferable that the organosiloxane elastomer have a tensile strength of at least 400 pounds per square inch and an elongation at break of at least 200 per cent. The best materials are those in which the tensile strength is at least 500 pounds per square inch and the elongation is at least 300 per cent. Thus it is preferable that the elastomer have a stress strain efficiency of 150 or more. This stress strain efficiency is computed as the tensile strength of the rubber in pounds per square inch multiplied by the per cent elongation at break divided by 1000.

A typical high efficiency siloxane rubber may be prepared by compounding a benzene soluble diorganopolysiloxane in which the structural units are $R_2SiO$, where R is selected from the group consisting of methyl, phenyl and siliconeopentyl radicals, and in which siloxane at least 90 molar per cent of the total number of R groups are methyl radicals, with a silica filler in amount from 20 to 50 parts by weight filler per 100 parts by weight polysiloxane, and from 1.5 to 6 per cent by weight based upon the weight of the siloxane of a vulcanizing agent selected from the group consisting of benzoyl peroxide and tertiary butyl perbenzoate. The compounded material is heated at a temperature above 110° C. and preferably below 250° C. until a coherent, non-tacky, rubbery product is obtained. The diorganopolysiloxane employed should preferably have a penetrometer reading of less than 380 after 10 seconds at 25° C. in accordance with ASTM, D-217-44T. The silica filler should have a pore volume of at least 4 ccs. per gram and a heat of wetting by water of from 0.3 to 1.0 calorie per cc. of pore volume. Compositions of this type are disclosed in greater detail in U. S. Patent 2,541,137.

It is to be understood that the present invention is not limited to the use of the particular siloxane elastomers described above. Other organosiloxane elastomers can be used, but they of course should have the tear resistance necessary to withstand being rolled back upon themselves.

The organosiloxane elastomer is formed into tubes of the desired size by any suitable means, such as by extrusion. The tube is then vulcanized to at least an extent such that it is substantially non-tacky. The assembled conductors are enclosed within this tube by any suitable means.

The following examples are illustrative only.

*Example 1*

3 conductor bars approximately 0.084 inch thick, 0.575 inch wide and 30 inches long were each individually insulated by winding them in a conventional half-lap fashion with a glass cloth tape which had been impregnated with an organopolysiloxane resin containing $(C_6H_5CH_3SiO)$, $(C_6H_5SiO_{1.5})$, and $(CH_3SiO_{1.5})$ units. The insulated conductors were cured for about 10 minutes at a temperature of 200° C. They were then placed on top of one another and forced into an extruded tube of a vulcanized silica filled dimethylpolysiloxane elastomer having a tensile strength of about 500 pounds per square inch and an elongation at break of about 500 per cent. This elastomer was prepared by the method disclosed in U. S. Patent 2,541,137. Each end of the elastomeric tube was then rolled back upon itself a distance of about 5 inches. The exposed ends of the conductor bar assembly were then forced into the general configuration illustrated in Fig. 6. The rolled-back ends of the tube were then rolled forward, thus covering the curved portion of the conductor bar assembly. This produced an armature coil side of the desired configuration with absolutely no injury to the outside insulation.

*Example 2*

Satisfactory results are also obtained when the above dimethylpolysiloxane elastomer is replaced by an elastomer containing 93 mol per cent dimethylsiloxane and 7 mol per cent diphenylsiloxane, which elastomer has an efficiency of 300; or by an elastomer containing 87 mol per cent dimethylsiloxane and 13 mol per cent phenylmethylsiloxane, having an efficiency of about 270.

That which is claimed is:

In a process for manufacturing a curved insulated conductor for use in an electric coil side the steps comprising enclosing a substantially straight and unformed insulated electrical conductor assembly, the insulation therein being of a flexible nature, in a tube of a vulcanized organosiloxane elastomeric material; said elastomeric material having a stress strain efficiency of at least 150 and being comprised of organosiloxane structural units of the general formula $R_2SiO$, where R is selected from the group consisting of methyl and phenyl radicals, at least 90 molar per cent of the R radicals being methyl radicals; rolling an end of the said tube back upon itself thus exposing a portion of said assembly; forming the exposed portion of said assembly to the desired curved configuration of an electric coil side; and unrolling said tube whereby the curved assembly is enclosed in the organosiloxane elastomer.

References Cited in the file of this patent

UNITED STATES PATENTS

| | | |
|---|---|---|
| 1,608,206 | Freedlander | Nov. 23, 1926 |
| 2,063,470 | Staples | Dec. 8, 1936 |
| 2,247,041 | Bergan | June 24, 1941 |
| 2,276,571 | Grypma | Mar. 17, 1942 |
| 2,442,640 | Dunn | June 1, 1948 |
| 2,480,173 | Wilson | Aug. 30, 1949 |
| 2,610,286 | Cox | Sept. 9, 1952 |